Inventor
Edward J. Johnston

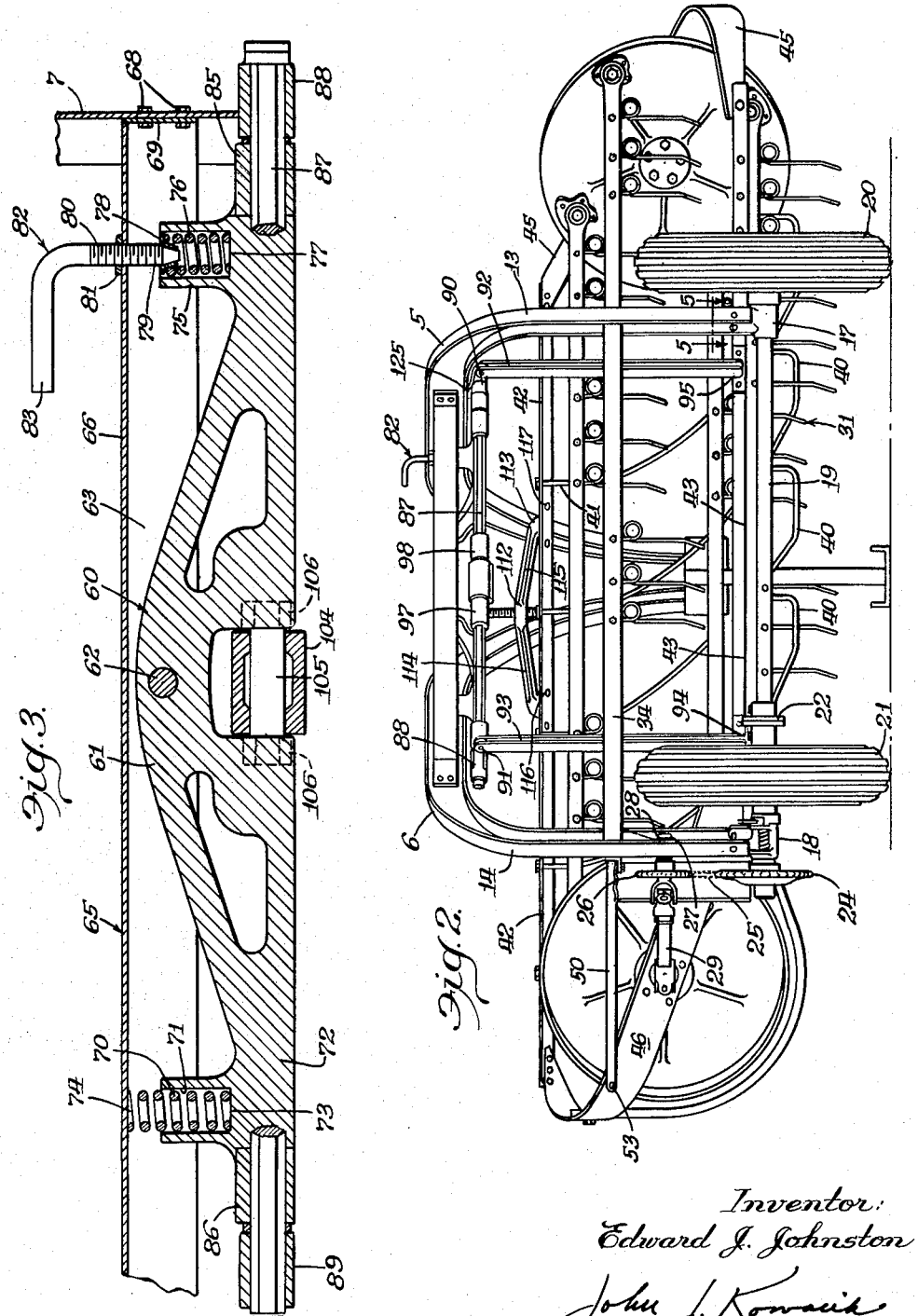

April 12, 1966   E. J. JOHNSTON   3,245,212
FLEXIBLE RAKE BASKET MOUNTING FOR SIDE DELIVERY RAKE
Filed Aug. 21, 1964   3 Sheets-Sheet 3

Inventor:
Edward J. Johnston
John J. Kowalik
Atty.

United States Patent Office 3,245,212
Patented Apr. 12, 1966

3,245,212
FLEXIBLE RAKE BASKET MOUNTING FOR SIDE DELIVERY RAKE
Edward J. Johnston, 1506 Homestead Road, La Grange, Ill.
Filed Aug. 21, 1964, Ser. No. 391,098
8 Claims. (Cl. 56—377)

This invention relates to side delivery rakes and more specifically to a novel suspension therefor, and is a continuing application of my application Serial No. 165,600 filed January 11, 1962, for: Flexible Rake Basket for Side Delivery Rake, now abandoned.

In side delivery rakes, it is customary to suspend the picking basket from the main frame structure with a cumbersome auxiliary frame inasmuch as heretofore it had been considered that the auxiliary frame was necessary in order to sustain the loads on the raking basket and more specifically on the tines and auxiliary structure in raking the material.

Contrary to this prevailing opinion, I have developed a novel, simplified suspension for the rake basket which employs a minimum of parts and suspends the basket in such manner that it floats with respect to the terrain over which it is operating.

A general object of the invention is to provide a novel, inexpensive and simplified effective suspension for a rake basket from the main frame.

A further object of the invention is to provide a novel suspension incorporating means for simultaneously raising and lowering the front and rear of the basket through a single control or operator.

A further object of the invention is to provide a novel mechanism in the suspension for yieldably controlling the lateral tilt of the basket.

A still further object of the invention is to provide a novel arrangement for adjusting the pitch of the teeth of the rake through the medium of raising and lowering the basket about a transverse axis.

These and other objects and advantages of the invention inherent and encompassed in the invention become more readily apparent from the specification and the drawings, wherein:

FIGURE 2 is a rear view with parts omitted;

FIGURE 3 is an enlarged cross-sectional view taken substantially on the line 3—3 of FIGURE 1;

Figure 1:
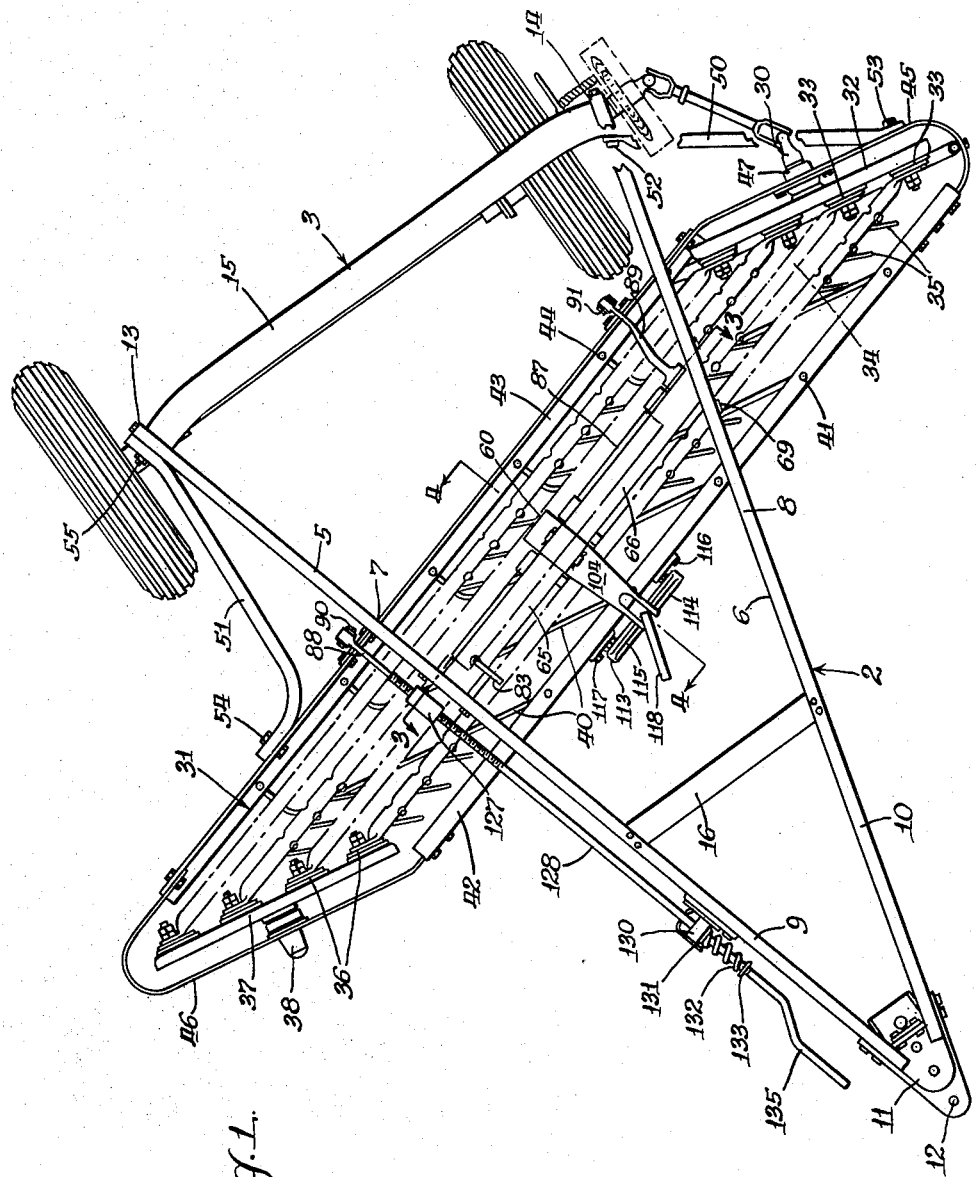
FIGURE 1 is a plan view of the novel rake incorporating the invention.

Describing the invention in detail and having particular reference to the drawings, there is shown a rake generally designated 2 which comprises a main frame structure generally designated 3 which includes a pair of fore-and-aft extending arched main beam members 5 and 6 having intermediate elevated portions 7 and 8 and downwardly sloping front end portions 9 and 10 which merge into and are connected by a draft member 11 which is adapted for connection through an opening 12 to the drawbar of an associated tractor or the like. The members 5 and 6 have downwardly extending rear end portions 13 and 14 which forwardly of their juncture with the portions 7 and 8 are interconnected by a transverse brace 15 to rigidify the construction. Similarly, a brace 16 is provided between the portions 7 and 8 adjacent to their juncture with the downwardly extending portions 9 and 10.

The rear ends of the rear portions 13 and 14 are provided with bearings 17 and 18 which mount a transverse axle 19, the axle interconnecting the wheels 20 and 21 through an overrunning clutch 22 to facilitate turning movements of the rake. The axle 19 is connected to a sprocket 24 which drives a chain 25 which in turn drives a sprocket 26 which is mounted on a stub axle 27 carried from the bearing 28 which is supported or mounted on the portion 14 above its lower end. The stub axle 27, which is connected to the sprocket 26, drives a universal shaft assembly 29 which extends outwardly of the portion 14 and is connected to the rear spider shaft 30 of the rake reel designated 31. The spider shaft 30 is connected to the spider or end member 32 which is an annular upright member rotating about a substantially fore-and-aft horizontal axis as represented by the shaft 30 and peripherally is connected through bearing means 33, 33 to the rear ends of the rake bars 34, 34. It will be realized that the axes of rotation of bearings 33, 33 are substantially parallel with the axis of rotation of the shaft 30 and that the bars 34 are disposed at an oblique angle with respect to the direction of movement of the rake. The bars 34 carry depending tines 35 and at their forward ends are connected by bearing means 36, 36 to the periphery of the upright or substantially vertical end plate or spider 37 which is mounted on a shaft and bearing assembly 38 on a substantially horizontal fore-and-aft extending axis offset laterally as well as forwardly with respect to the axis of the shaft 30. It will be realized that the shaft 30 and the assembly 38 mount the end members 32 and 37 respectively at their centers and that pursuant to rotation of the end members the bars orbit in an elliptical path sweeping the material laterally under the stripper bars 40, 40 which are spaced to accommodate the sets of the tines 35 therebetween, the strippers 40 having their forward ends connected as at 41 to a transverse front rake basket member 42, and at their rear ends to the transverse rake basket member 43 as at 44, the members 42 and 43 being substantially parallel and at opposite ends being connected to the end beams 45 and 46, the beam 45 providing a mounting for a bearing 47 for the shaft 30 and the member 46 providing a mounting for the bearing and shaft assembly 38.

The position of the basket and the reel is stabilized by means of two stabilizing compression members 50 and 51 which are disposed behind the basket, the member 50 extending between the rear main frame portion 14 and the member 45 and being pviotally connected thereto as by bolts 52 and 53 on generally parallel fore-and-aft extending axes and the member 51 being connected as at 54 at its front end to the rear beam member 43 by means of a bolt on a substantially fore-and-aft extending axis and at its rear end by bolt 55 on a susbtantially transverse generally horizontal axis, bolt 55 being connected to the member 13. It should be realized that the axes of connection of these members 50 and 51 are universal and are so chosen as to not inhibit lateral tilting or pitch adjustment of the rake basket.

The basket is carried from the main frame intermediate its ends by a novel suspension mechanism generally designated 60 which comprises a balance beam or pivot member 61 arched upwardly and intermediate its ends being pivotally mounted on a fore-and-aft extending pin or bolt 62 which at its front and rear ends extends through the front and rear dependent flanges 63, 64 of a channel-shaped support brace 65 of the main frame structure, the brace 65 including a top wall 66 which interconnects the front and rear flanges and extends therewith to the portions 7 and 8 of the main frame and is connected thereto as by bolts 68 which extend through the portion 7 and the flange 69 of the brace 65 and bolts 69' which similarly extend through the portion 8 and the adjacent end portion of the brace 65. Thus it will be seen that the balance of the beam 61 is accommodated so as to tilt laterally of the frame about a substantially fore-and-aft axis. The tilt is controlled by means of a pair of yieldable means 70 and 76, said means 70 being in a form of a compression spring which at its lower end is housed within a pocket 71 at one end 72 of the balance beam 61, the spring 70 having its lower end seated as at 73 at the bottom of the pocket structure and at its upper end being seated as at 74 against the underside of the top web 66 of the brace 65. The opposite end of the balance beam is similarly constructed and has a pocket structure 75 which encloses the spring 76 which has its lower end seated as at 77 within the bottom of the pocket, the upper end of the spring 76 being seated against a cap 78 which admits the lower end of a bolt 79, the bolt having a threaded shank 80 which projects through a reinforced threaded opening 81 in the wall 66 of the brace member 65. The upper end of the shank 80 of the adjusting member generally designated 82 is bent to provide a handle 83 which rotates the adjusting member to thread it down or elevate the same and thus determine the relative position of the balance beam with attendant compression of the spring 70. It should be realized that the spring 76 is preferably heavier than the spring 70, nevertheless the beam 61 is still accommodated lateral oscillation about the pin 62 due to the yieldable nature of the springs 70 and 76. The unit 62 therefore functions as a lateral inclination positioning means for the rake basket.

The member 61 is provided adjacent to each end with bearings 85 and 86 which support opposite ends of a shaft 87 rearwardly of the member 61, said shaft being preferably hexagonal in shape and extending through complementary openings in rearwardly projecting suspension arms 88 and 89 which at their rear ends are pivotally connected as at 90 and 91 to the depending hangers 92 and 93 which at their lower ends are pivotally connected as at 94 and 95 to the transverse rear basket beam 43. The shaft 87 passes through a pair of rearwardly projecting bearings or support ears 97 and 98 (FIGURES 1 and 2) on the balance beam 61 adjacent to its center and intermediate the bearings 97, 98 the shaft 87 is keyed to a gear segment 99 which is retained in position on the shaft by means of the tightening screw 100. The teeth 101 of the gear segment 99 mate with teeth 102 of a companion gear segment 103 which is provided on the forward end of a forwardly extending arm 104, the arm 104 being mounted on the axis of the gear segment 103 on a shaft 105 which is suitably mounted in support ears 106 at the forward side of the balance beam 61. The forward end of the arm 104 is provided with a ball 107 which is apertured at 108 and mounts the upper end 109 of an adjusting screw 110, the screw 110 having a threaded lower end 111 which is threaded through the apex 112 of a V-shaped connector element 113 which has laterally extending portions 114 and 115 connected at its ends as by bolts 116 and 117 to the forward beam member 42 of the rake basket. Thus it will be readily appreciated that by rotating the handle 118 which is connected as at 119 to the upper end of the adjusting bolt 110, the angular position and the pitch of the teeth is adjusted. The bolt is provided with a shoulder 120 which sits on top of the ball portion 107.

It will also be observed that rotation of the gear sector 99 in a clockwise direction effects a counterclockwise rotation of the gear sector 103 which has the effect of lowering the front and rear of the basket through the respective suspension linkage and by rotating the gear sector 99 in a counterclockwise direction the forward gear sector 103 will rotate in a clockwise direction and thus the arms 88, 90, and 104 will elevate at their distal ends and the basket will elevate. Rotation in the opposite direction lowers the basket.

The structure for rotating the shaft 87 comprises an upward extension arm 125 on the arm 88, the upper end of the arm 125 having a pivotal connection as at 126 to a screw nut sleeve 127 which is threaded on the adjusting rod 128 which extends alongside the portion 7, the forward end of the rod 128 being mounted within a bearing 130 from a bracket 131 which is carried from the side of the member 5. Forwardly of the bearing 130 a cushion spring 132 is sleeved over the rod 128 and the spring 132 at its rear ends seating against the forward side of bearing 130 and its forward end being seated against a washer 133 which is secured to the rod 128. The forward end of the rod 128 is formed as a crank 135 by means of which the rod is adapted to be rotated in order to thread and unthread with respect to the sleeve nut portion 127 which effects rotation of the shaft 87 and elevation and lowering of the basket assembly.

It will be readily noted that a simple and efficient suspension mechanism is provided for the rake and that the rake basket has yieldable lateral sway control and is readily adjustable through a single mechanism vertically and that lateral tilt is readily controlled while preserving the yieldable or flexible nature of the mounting.

Figure 5:
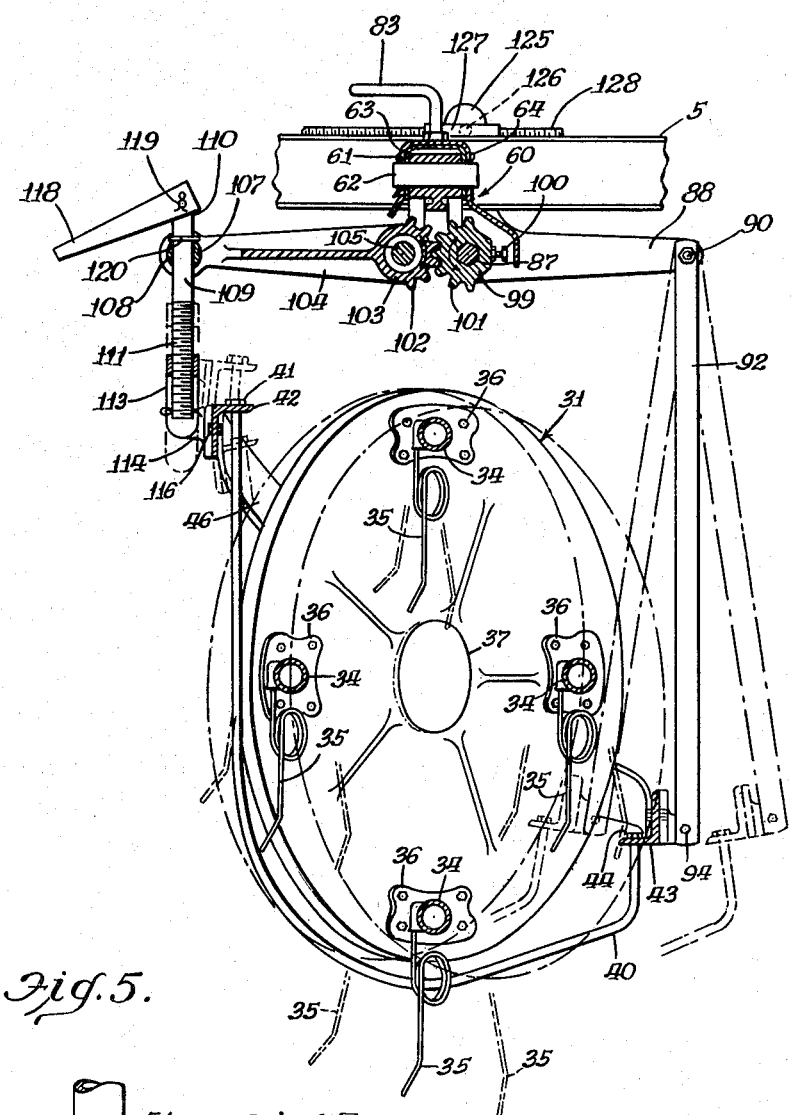
FIGURE 5 is an enlarged cross-sectional view taken substantially on the line 5—5 of FIGURE 2.
Figure 4:
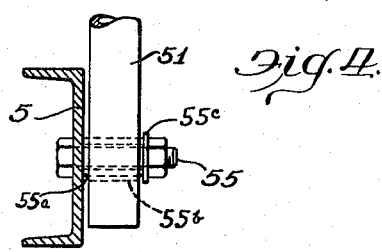
FIGURE 4 is an enlarged transverse vertical sectional view taken substantially on the line 4—4 of FIGURE 1.

It will be understood that the loose connections at 52, 53, 54 and 55 are the same and provide universal angling between the connected parts and as best seen in FIGURE 5 each comprises a spacer sleeve 55a on a bolt and the associated stabilizer member has a loose opening 55b and loosely fits between frame beam and the washer 55c.

Having described a preferred embodiment of the invention, it will be realized that the same is only for the purpose of disclosure and that other forms of the invention will become readily apparent to those skilled in the art within the scope of the appended claims.

What is claimed is:

1. A side delivery rake having an ambulatory frame, an elongated rake therebeneath, means pivotally suspending the rake from the frame on an axis transverse to the rake accommodating lateral tilting of the rake, said means comprising a frame member and a pivot member therebelow disposed above the rake, a pivot element on said axis interconnecting said members, and yieldable means reactively disposed between said members for yieldably resisting tilting of the rake about said axis, said means suspending the rake comprising lift arm means directly connected on the pivot member and supporting the rake.

2. A side delivery rake having an ambulatory frame, an elongated rake therebeneath, means pivotally suspending the rake from the frame on an axis transverse to the rake accommodating lateral tilting of the rake and yieldable means reactively disposed between the suspension means and the frame for yieldably resisting tilting of the rake about said axis and said yieldable means comprising spring means compressed between the suspension means and the frame at opposite sides of said axis, and adjusting means reacting against one of the spring means for varying the compression thereof, said means suspending the rake incorporating lift arm means for lifting and lowering the rake, said lift arm means pivoting about said axis transverse to the rake.

3. In a side delivery rake having frame means, an elongated rake beneath said frame means, suspension means supporting the rake from the frame means and including a balance beam extending generally parallel with the rake and forwardly and rearwardly extending arm means pivoted to the beam and connected to the rake at fore and aft displaced areas, means intermediately pivoting the beam from the frame means about a generally horizontal axis extending transversely of the rake, and adjustable yieldable means interposed between the beam and frame and yieldably resisting pivoting of the beam.

4. In a side delivery rake, an ambulatory frame, a transverse rake, and suspension means swingably supporting said rake medially thereof from the frame and said suspension means including a balance beam pivoted to the frame, forwardly and rearwardly extending arm means mounted on the beam, intermeshing spur gear means connected to respective arm means, and operator means for rotating the gear means for lifting and lowering the rake.

5. In a rake having an ambulatory main frame, an elongated rake extending transversely of the frame, and suspension means supporting the rake from the frame and comprising forwardly and rearwardly extending rigid arms at respective sides of the frame and having pivotal axes disposed directly above the rake and means for conjunctively elevating and lowering the arms.

6. In a side delivery rake having a support frame with front and rear ends, a rake beneath the frame, and suspension means carrying the rake from the frame and including a member pivoted on a generally horizontal axis from the frame, a pair of generally parallel shaft means on said member, a pair of arms connected to one shaft means and extending rearwardly toward said rear end, a single arm extending from the other shaft means toward said front end, linkage connecting said arms to opposite ends of the rake and said one arm to a central portion of the rake, and means for conjunctively elevating and lowering said arms.

7. The invention according to claim 6 and said arms being spaced laterally and said arm being located intermediate said arms.

8. In a rake, a frame, a rake means having forward and rear positions and pivoted intermediate it ends beneath the frame, and yieldably controlled suspension means between the rake means and frame including spring means under compression between the frame and rake means at opposite sides of the pivot axis between the rake means and said frame, and said suspension means comprising arm means extending in opposite directions axially of the axis of pivot and pivoted thereabout, and means suspendingly connecting the forward and rear portions of the rake means with respective arm means.

References Cited by the Examiner
UNITED STATES PATENTS

| | | | |
|---|---|---|---|
| 2,635,412 | 3/1953 | Schroeppel | 56—377 |
| 2,672,005 | 3/1954 | Hamilton | 56—377 |
| 2,930,178 | 3/1960 | Van Lely et al. | 56—377 |
| 2,985,248 | 3/1961 | Richardson | 172—570 X |
| 3,103,777 | 9/1963 | Harbage et al. | 56—377 |

ANTONIO F. GUIDA, *Acting Primary Examiner.*

RUSSELL R. KINSEY, A. G. STONE, *Examiners.*

M. C. PAYDEN, *Assistant Examiner.*